US008094896B2

(12) United States Patent
Dutta et al.

(10) Patent No.: US 8,094,896 B2
(45) Date of Patent: Jan. 10, 2012

(54) SYSTEMS, METHODS AND APPARATUS FOR DETECTION OF ORGAN WALL THICKNESS AND CROSS-SECTION COLOR-CODING

(75) Inventors: Sandeep Dutta, Waukesha, WI (US); Csongor Pal Sprencz, Budapest (HU); Maria-Magdalena Nay, Paris (FR); Laurent Launay, St Remy Chevreuse (FR)

(73) Assignee: General Electric Company, Schenectady, NY (US)

( * ) Notice: Subject to any disclaimer, the term of this patent is extended or adjusted under 35 U.S.C. 154(b) by 940 days.

(21) Appl. No.: 12/102,531

(22) Filed: Apr. 14, 2008

(65) Prior Publication Data
US 2009/0257627 A1    Oct. 15, 2009

(51) Int. Cl.
*G06K 9/00* (2006.01)
(52) U.S. Cl. .................................................. 382/128
(58) Field of Classification Search .............. 396/128; 382/128
See application file for complete search history.

(56) References Cited

U.S. PATENT DOCUMENTS

| | | | |
|---|---|---|---|
| 7,486,811 B2 * | 2/2009 | Kaufman et al. | 382/128 |
| 2005/0207630 A1 * | 9/2005 | Chan et al. | 382/131 |
| 2007/0049839 A1 | 3/2007 | Odry et al. | |
| 2007/0049840 A1 | 3/2007 | Odry et al. | |
| 2007/0071301 A1 | 3/2007 | Kiraly et al. | |
| 2007/0127800 A1 | 6/2007 | Coenen et al. | |

* cited by examiner

*Primary Examiner* — Rodney Fuller
(74) *Attorney, Agent, or Firm* — Dean D. Small; The Small Patent Law Group

(57) ABSTRACT

Systems, method and apparatus in which some implementations of respiratory structure imaging includes tracking a portion in a organ, determining wall contours in the portion and color-coding confidence in the wall contours. Some implementations of the color-coding includes selecting a cross section of a portion, determining average intensity of a wall in the organ from equally space ray vectors, determining confidence from a distribution of the average intensity, labeling sections of an organ image in reference to the average intensity, and color coding sections of the image in the memory according to the confidence.

20 Claims, 12 Drawing Sheets
(1 of 12 Drawing Sheet(s) Filed in Color)

SYSTEMS, METHODS AND APPARATUS FOR DETECTION OF ORGAN WALL THICKNESS AND CROSS-SECTION COLOR-CODING

FIELD OF THE DISCLOSURE

This disclosure relates generally to healthcare imaging systems, in particular to imaging of respiratory systems in human patients.

BACKGROUND

Chronic obstructive pulmonary disease (COPD) is one of the top lung diseases affecting the population and patients need expensive long term care. Emphysema and chronic bronchitis are two main categories of diseases that comprise COPD. Chronic bronchitis affects the small bronchioles of the airway tree in the lungs. The airways inside the lung exist in a tree like structure that can be best analyzed in three dimensions (3D).

The measurements of the airway wall and the lumen are the best indicators of the presence of bronchitis in the patients. In two-dimensions (2D) the normal airway cross sections are not always perpendicular to the cross section of the axial plane and this can produce erroneous results. One of the important measurements in the COPD is the determination of the wall thickness on the bronchial section. The airways of strong interest (in the 5th or below branch generations of the bronchial tree) are very small in size and with conventional imaging resolutions, an image of the airways of strong interest do not provide many voxels for analysis. Also the airways of strong interest are almost always accompanied by small blood vessels that can sometimes distort the analysis of the walls.

BRIEF DESCRIPTION

In some aspects, the systems, methods and apparatus described herein identify three-dimensional borders of the contours in a respiratory region of interest, and also in some aspects, visually depict a confidence of the accuracy of measurements of the entire respiratory airway or of individual parts of the cross section of the inner and outer walls of the airway.

In one aspect, systems, method and apparatus of respiratory structure imaging includes tracking a bronchial tree in a segmented respiratory structure, determining wall contours in the bronchial tree and color-coding confidence in the wall contours.

In another aspect, color-coding includes selecting a cross section of a bronchial airway of a bronchial tree, determining average intensity of a wall in the bronchial airway from equally space ray vectors, determining confidence from a distribution of the average intensity, labeling sections of a respiratory structure image in reference to the average intensity, and color coding sections of the image in the memory according to the confidence.

In a further aspect, a system includes a processor and a storage device coupled to the processor including a plurality of computed-tomography three-dimensional (3D) images. The system also includes software apparatus operative on the processor that includes an intensity analyzer operable to receive a representation of a segmented organ in the computed-tomography 3D images and operable to receive a plurality of equally-spaced ray vectors, and to determine average voxel intensity of contours of cross sections from the representation of a segmented organ and from the equally-spaced ray vectors. The system also includes a confidence analyzer operable to determine a measure of confidence of the contours from the average voxel intensity of contours of the cross sections.

In yet a further aspect, a color coding scheme or other cue indicates the confidence in measurement of the boundaries and contours of segmented organ(s) and/or structure(s).

The systems, methods and apparatus described herein provide air-wall detection, start point detection and color-coding identification. A determination of which parts of the contours are accurate and which parts of the contours of which the accuracy is not confident, allows the user to take correct measurements from the confident sections. The systems, methods and apparatus described herein also allow the user a visual capability to manually correct the contours upon command. In addition, reports and statistics of the airways can be categorized easily into confident and non-confident categories.

Systems, processes, and computer-readable media of varying scope are described herein. In addition to the aspects and advantages described in the brief description, further aspects and advantages will become apparent by reference to the drawings and by reading the following detailed description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
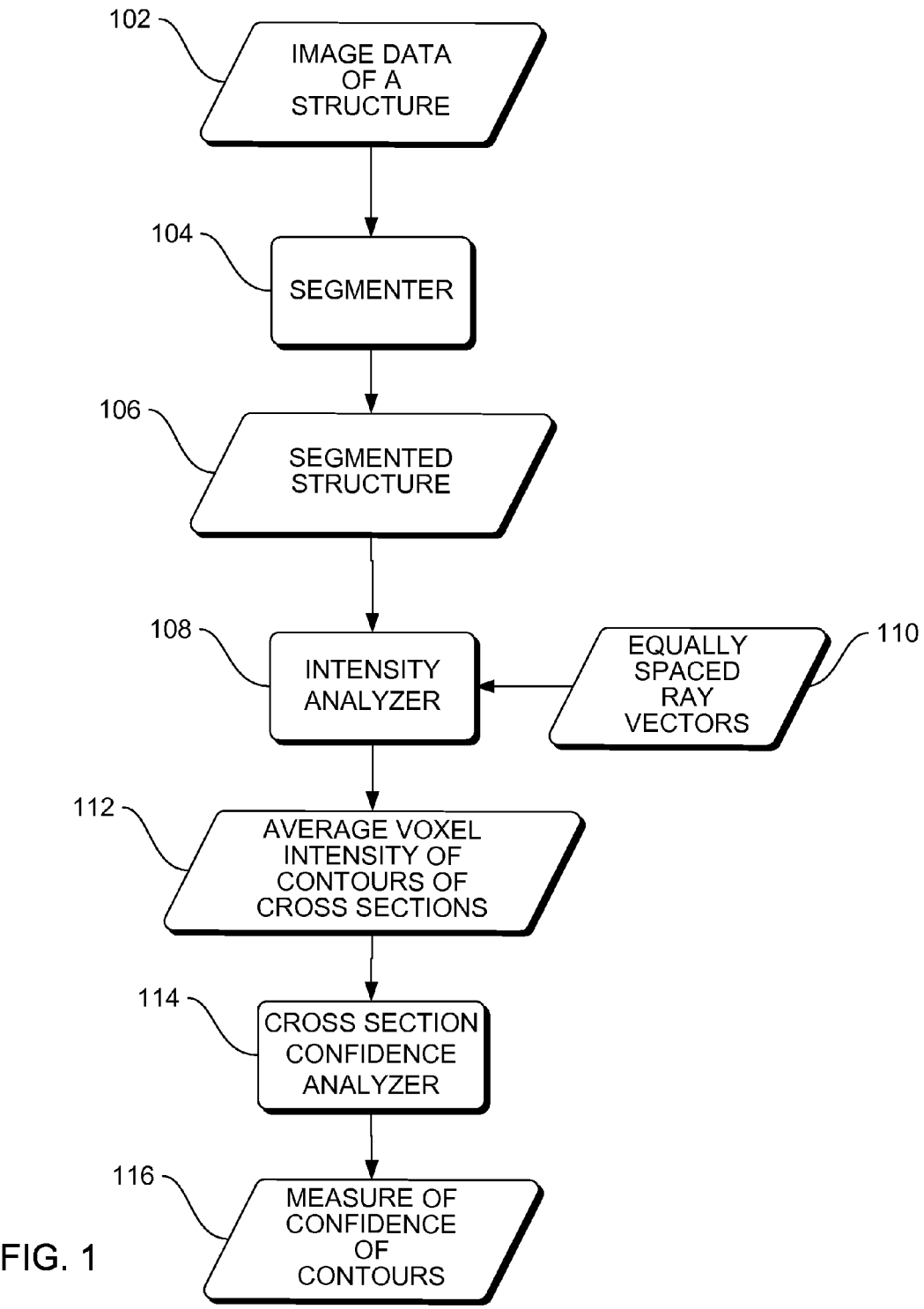
FIG. 1 is a block diagram of an overview of a system to image respiratory structures.

In the following detailed description, reference is made to the accompanying drawings that form a part hereof, and in which are shown, by way of illustration, specific embodiments that can be practiced. These embodiments are described in sufficient detail to enable those skilled in the art to practice the embodiments, and it is to be understood that other embodiments can be utilized, and that logical, mechanical, electrical and other changes can be made, without departing from the scope of the embodiments.

The detailed description is divided into six sections. In the first section, a system level overview is provided. In the second section, example methods are described. In the third section, images are illustrated. The fourth section discloses hardware and an operating environment, in conjunction with which embodiments can be practiced. The sixth section provides a conclusion which reviews aspects of the subject matter described in the preceding segments of the detailed description. A technical effect of the subject matter described herein includes graphical representations of cross sections of a respiratory structure that are color-coded to indicate a measure confidence on the location and extremity of the walls of the respiratory airways.

As used herein, the term "Hounsfield Units" or the abbreviation "HU" refers to units employed for mapping effective linear X-ray attenuation coefficients which comprise X-ray or Computer-aided Tomographic (CT) images to a convenient standard numeric scale. Values on this scale are expressed in Hounsfield Units (HU) and are sometimes referred to as CT numbers. On the HU scale, the value of water in a CT image is zero and the value of air is −1000.

As used herein, the term "pixel" means a two-dimensional unit cell or elementary picture element in a display. As used herein, the term "voxel" means a three-dimensional unit cell for representation of three-dimensional data fields. Pixels and voxels have a set of values associated with the pixels and voxels.

Segmentation, in the sense used here, involves differentiating between data representing various organs. Segmentation can also include identifying data describing pathological features. Segmentation can be employed to clearly define organs, or for quantification of the size of a lesion. As used herein, the term "segmentation" means the process of partitioning a digital image into multiple regions (sets of pixels), or of partitioning a digital three-dimensional representation into multiple regions (sets of voxels). The goal of segmentation is to simplify and/or change the representation of a dataset into something that is more meaningful and as a way of facilitating analysis and quantification of features of interest. Image segmentation is typically used to locate objects and boundaries (lines, curves, etc.) in images, with similar processes being employed with volumetric data.

The result of segmentation is a set of regions that can collectively cover the entire image or volumetric dataset, or a set of contours extracted from the image or volumetric dataset via edge detection and other conventional signal or image processing techniques. Each of the pixels or voxels in a given region are similar with respect to some characteristic or computed property, such as color, intensity or texture. Adjacent regions are significantly different with respect to the same characteristic(s).

As used herein, the term "phase" is used to distinguish between measurements taken at a time when a specific biological activity is at a specific stage. For example, in case of a contrast-enhanced CT examination of the liver the term "arterial phase" refers to a time when contrast agent is visible primarily in the heart and arteries, whereas the term "venous phase" is used to refer to a time when contrast agent is visible in the portal vein of the respiratory system.

As used herein, the term "histogram" refers to a function which assigns a probability to each intensity value. This probability shows the probability of a voxel or pixel to have this intensity. For example, a probability of 0.5 for an intensity of 100 Hounsfield Units means that half of the voxels or pixels have a value of 100 Hounsfield units. Histograms can relate to a single image, or can relate to two or more images.

As used herein, the term "registration" means alignment of features contained in at least portions of two or more images to establish multiple points representative of the same physical feature. In other words, data elements representing corresponding portions of each of two or more datasets are co-located or coordinated to allow meaningful combination of the elements of the two or more datasets.

System Overview

FIG. 1 is a block diagram of an overview of a system 100 to image respiratory structures. System 100 clearly analyzes and identifies which respiratory airway wall measurements are affected by presence of nearby blood vessels. Without system 100, determining which sections of the contours are reliable for measurement would be difficult, and thus developing a correct medical diagnosis and treatment of the wall of the bronchial tree.

In system 100, one or more images 102 of an organ structure, such as a respiratory structure, is received and loaded into memory. A segmenter 104 segments the organ (or the respiratory structure) from other organs in the images 102, resulting in image files of segmented organ or upper respiratory tree 106.

System 100 also includes an intensity analyzer 108 that is operable to receive the representation 106 of the segmented upper respiratory tree or other organ in the computed-tomography images. The intensity analyzer 108 is also operable to receive a plurality of equally-spaced ray vectors 110. The intensity analyzer 108 is operable to determine average voxel intensity 112 of contours of cross sections from the representation 106 of a segmented upper respiratory tree (or other organ) and from the equally-spaced ray vectors 110.

System 100 also includes a cross section confidence analyzer 114 that is operable to determine a measure 116 of confidence of contours from the average voxel intensity of contours of the cross sections 114. In some implementations, the cross section confidence analyzer 114 is operable to label a ray with an indication of an airway (such as "AIRWAY") if the average wall intensity along a ray is in a range of a normal airway Hounsfield Units (HU), label a ray with an indication of a vessel (such as "VESSEL") if the average wall intensity along a ray is in a range of a blood vessel HU, and label a ray with an indication of a mixed area (such as "MIXED AREA") if the average wall intensity along a ray is in between the range of a blood vessel HU and the range of normal airway HU.

System 100 provides improved contour detection quality, color-coding which shows where distance measurements can be applied, removing the larger cross sections of airway from tracking and wall detection, because those airways are not primarily of interest in chronic obstructive pulmonary disease The systems, methods and apparatus herein describe a color coding scheme in which the confidence in measurement of the boundaries and contours of segmented organ(s) and/or structure(s) is determined and presented. The systems, methods and apparatus described herein are applicable to all organs and structures. For example, the contours and boundaries of a segmented heart chamber can be analyzed to determine the confidence of measurement of the contours and boundaries by analyzing the intensities of the region, and the confidence in the measurement can be present the user with a cue as to the extent or degree of the confidence. The systems, methods and apparatus are applicable to computed tomography (CT) images because the expected and/or ideal intensities of a certain organ/region in CT images are known, and using statistical comparisons of the actual images to the expected/ideal intensities, a confidence in the contours can be determined and color-code for presentation.

Methods

The aspects described and disclosed herein can be implemented via processes such as those described below with reference to FIGS. 2-8. Processes 200-800 of FIGS. 2-8 can be implemented via computer-readable instructions embodied as computer-readable code on a computer-readable medium (such as the memory devices 1150 of FIG. 11, supra) which, when executed by one or more processors (e.g., computer 1130 and/or image processing engine 1135 of FIG. 11) causes the one or more processors to implement the acts described infra with respect to system 100, in order to segment the respiratory structure by combining the information of all available phases of a contrast enhanced CT examination. The datasets can comprise pixel data, voxel data or other representational forms, and can be derived from any of many different types of instruments developed for the purpose of collecting data representative of anatomical (and often internal) aspects of a patient, such as the patient 1112 depicted in FIG. 11.

Figure 2:
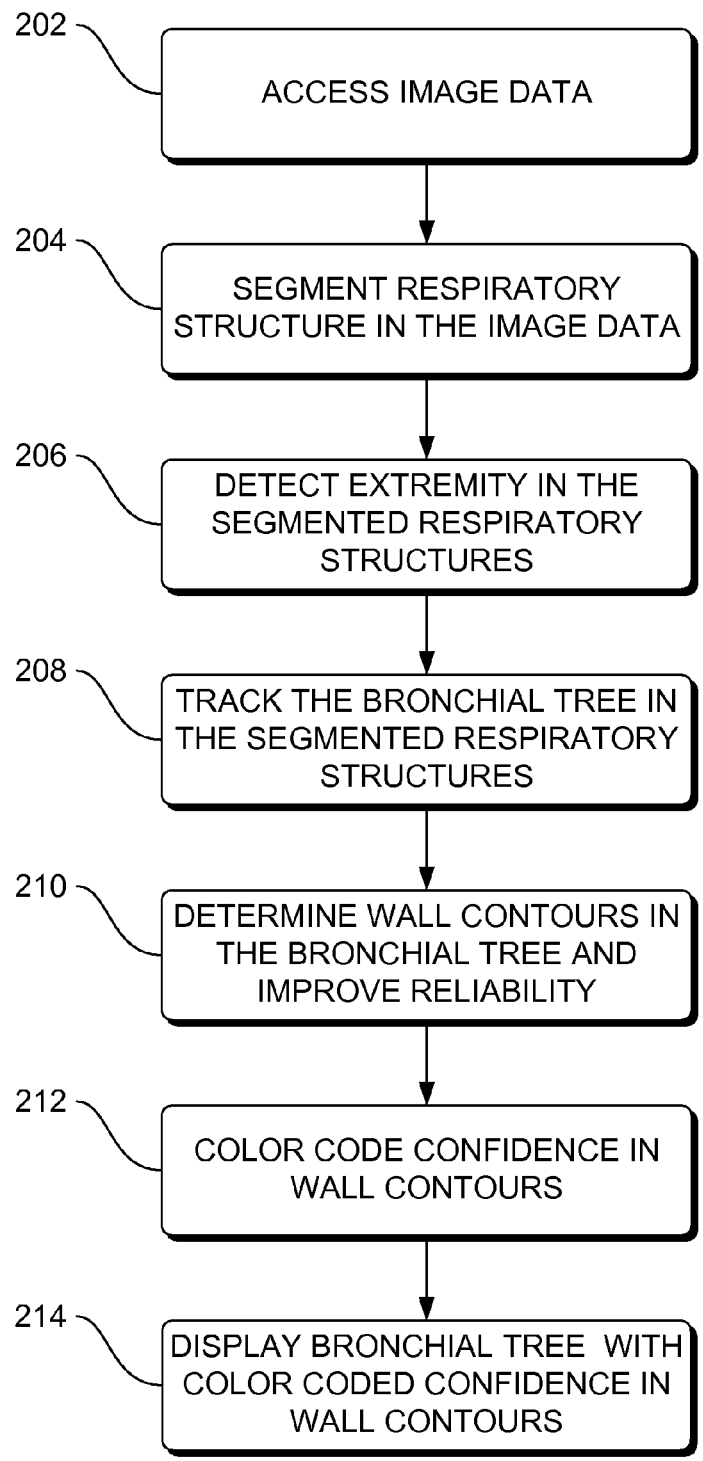
FIG. 2 is a block diagram of a flowchart of a method to image a respiratory structure.

FIG. 2 is a block diagram of a flowchart of a method 200 to image a respiratory structure.

Some aspects of method 200 include accessing patient image data in a memory, at block 202. In some variations, the accessing acquiring a computed-tomography (CT) image of the patient, yielding the patient image data in the memory. In other implementations, the image is a modality other than CT, such as X-ray tomosynthesis or magnetic resonance (MR) imaging etc.

Some aspects of method 200 include identifying segments of a respiratory structure in the image data, at block 204. Some variations of identifying segments at block 204 include the actions described in FIG. 3 below.

Some aspects of method 200 include detecting at least one extremity in the segmented respiratory structures, at block 206. Some variations of detecting extremities at block 206 include the actions described in FIG. 4 below.

Some aspects of method 200 include tracking a bronchial tree in the segmented respiratory structure, at block 208. Some variations of tracking bronchial tree at block 208 include the actions described in FIG. 5 below.

Some aspects of method 200 include determining wall contours in the bronchial tree and improve reliability, at block 210. Some variations of determining wall contours at block 210 include the actions described in FIG. 6 below.

Some aspects of method 200 include color-coding confidence in wall contours, at block 212. Some variations of color-coding confidence at block 212 include the actions described in FIG. 7 below. One example of an image of a bronchial airway walls color coded according to confidence is FIG. 10.

Some aspects of method 200 include displaying a visual representation of the bronchial tree with color-coded confidence in wall contours of the bronchial tree, at block 214.

Figure 3:
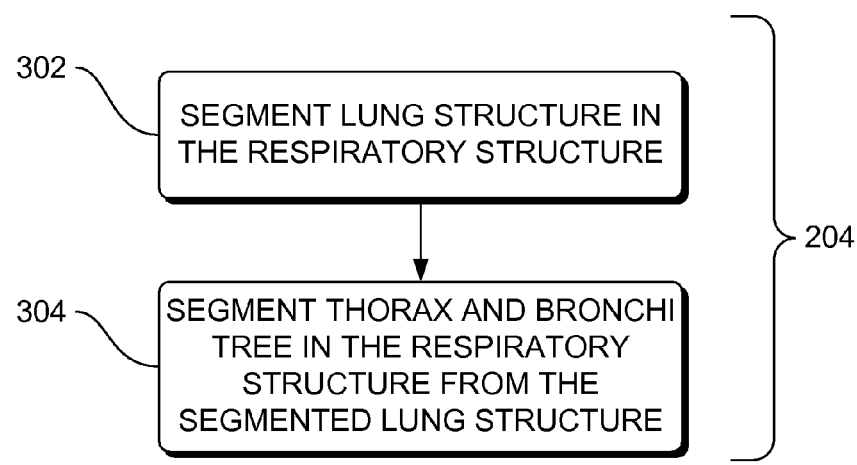
FIG. 3 is a block diagram of a flowchart of a method to identify segments of a respiratory structure.

Method 200 provides improved contour detection quality, color-coding which shows where distance measurements can be applied, remove the larger cross sections of airway from tracking and wall detection, because those airways are not primarily of interest in chronic obstructive pulmonary disease, FIG. 3 is a block diagram of a flowchart of a method 300 to identify segments of a respiratory structure. Method 300 is one example of identifying segments of a respiratory structure at block 204 in FIG. 2.

Some aspects of method 300 include segmenting a lung structure in the respiratory structure, at block 302. The segmented lung structure is also known as a lung mask. In some implementations, the segmented lung structure (lung mask) is a binary mask wherein a value of 1 associated with a voxel indicates that the voxel is within lung structure and a value of 0 associated with a voxel indicates that the voxel is outside the lung structure. The lung structure includes lung tissue, airways and vessels within the lung boundary.

Some aspects of method 300 include segmenting a thorax and bronchi tree in the respiratory structure from the segmented lung structure (lung mask), at block 304.

Figure 4:
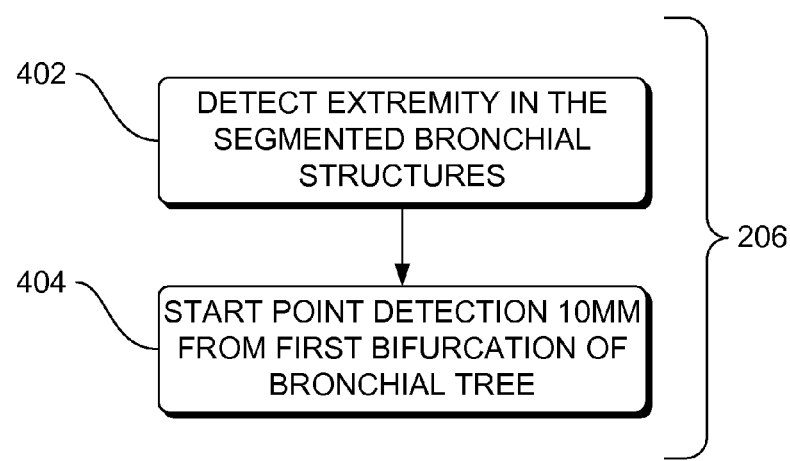
FIG. 4 is a block diagram of a flowchart of a method to detect at least one extremity in a segmented respiratory structure.

FIG. 4 is a block diagram of a flowchart of a method 400 to detect at least one extremity in a segmented respiratory structure. Method 400 is one example of detecting one of more extremity(s) in a segmented respiratory structure at block 206 in FIG. 2.

Some aspects of method 400 include detecting extremity in the segmented bronchial structures, at block 402. Some aspects of method 400 include starting point detection about 10 mm from a first bifurcation of the bronchial tree, at block 404.

Figure 5:
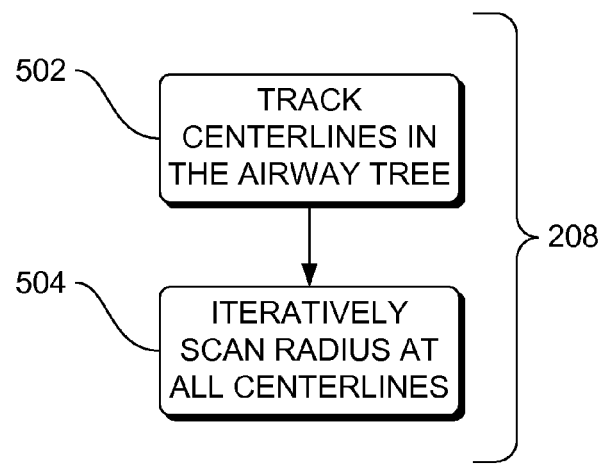
FIG. 5 is a block diagram of a flowchart of a method to track a bronchial tree in a segmented respiratory structure.

FIG. 5 is a block diagram of a flowchart of a method 500 to track a bronchial tree in a segmented respiratory structure. Method 500 is one example of tracking a bronchial tree in a segmented respiratory structure at block 208 in FIG. 2.

Some aspects of method 500 include tracking centerlines in the airway tree, at block 502. Some aspects of method 500 include scanning iteratively radius at all centerlines, at block 504.

Figure 6:
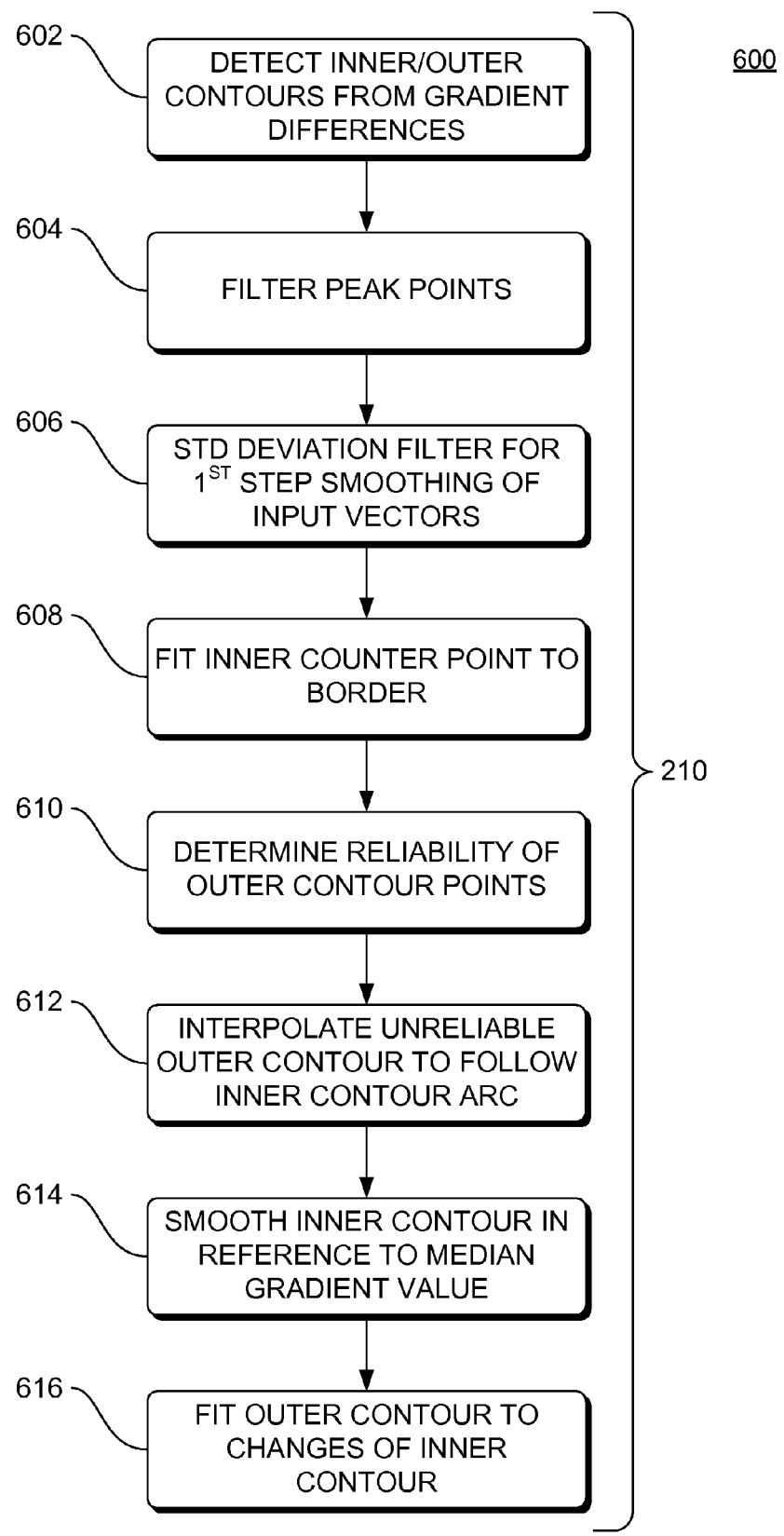
FIG. 6 is a block diagram of a flowchart of a method to determine wall contours in a bronchial tree.

FIG. 6 is a block diagram of a flowchart of a method 600 to determine wall contours in a bronchial tree. Method 600 is one example of determining wall contours in a bronchial tree at block 210 in FIG. 2.

Some aspects of method 600 include detecting inner/outer contours from gradient differences, at block 602. Thereafter, a series of filters described in the remainder of method 600 applied to the image data to eliminate big differences on the inner/outer contour distance in the image data.

Some aspects of method 600 include filtering peak points to eliminate non homogeneous lumen area, at block 604. Some aspects of method 600 include filtering within one standard deviation to smooth input vectors, at block 606. The standard deviation filter smoothes big differences between the distances at nearest points in the image.

Some aspects of method 600 include fitting inner counter point to border, at block 608. Some aspects of method 600 include determining reliability of outer contour points, at block 610.

Figure 9:
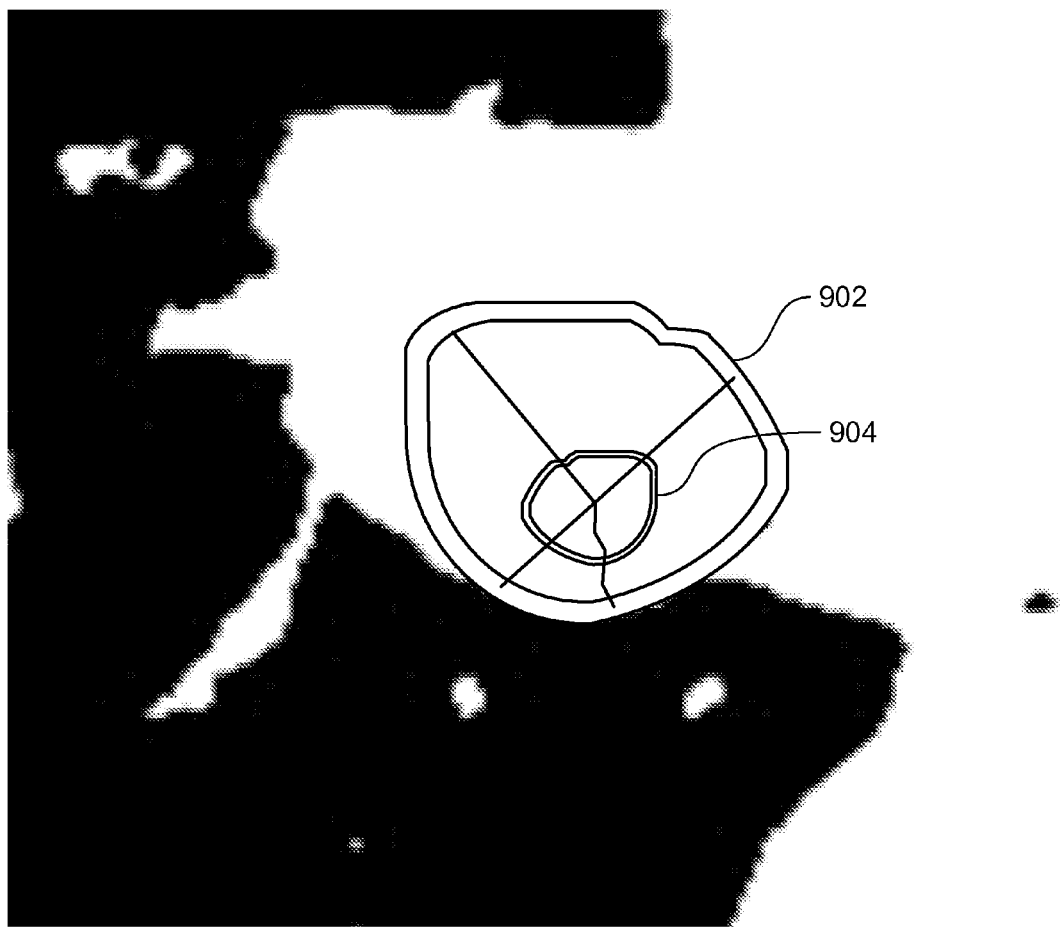
FIG. 9 is an illustration of exemplary results of smoothing of inner contours.

Some aspects of method 600 include interpolating unreliable outer contours to follow an inner contour arc, at block 612. Some aspects of method 600 include smoothing inner contours of a bronchial airway in reference to a medium gradient value, at block 614. FIG. 9 shows an example of the results of smoothing.

Some aspects of method 600 include fitting outer contour to changes of inner contour, at block 616.

Figure 7:
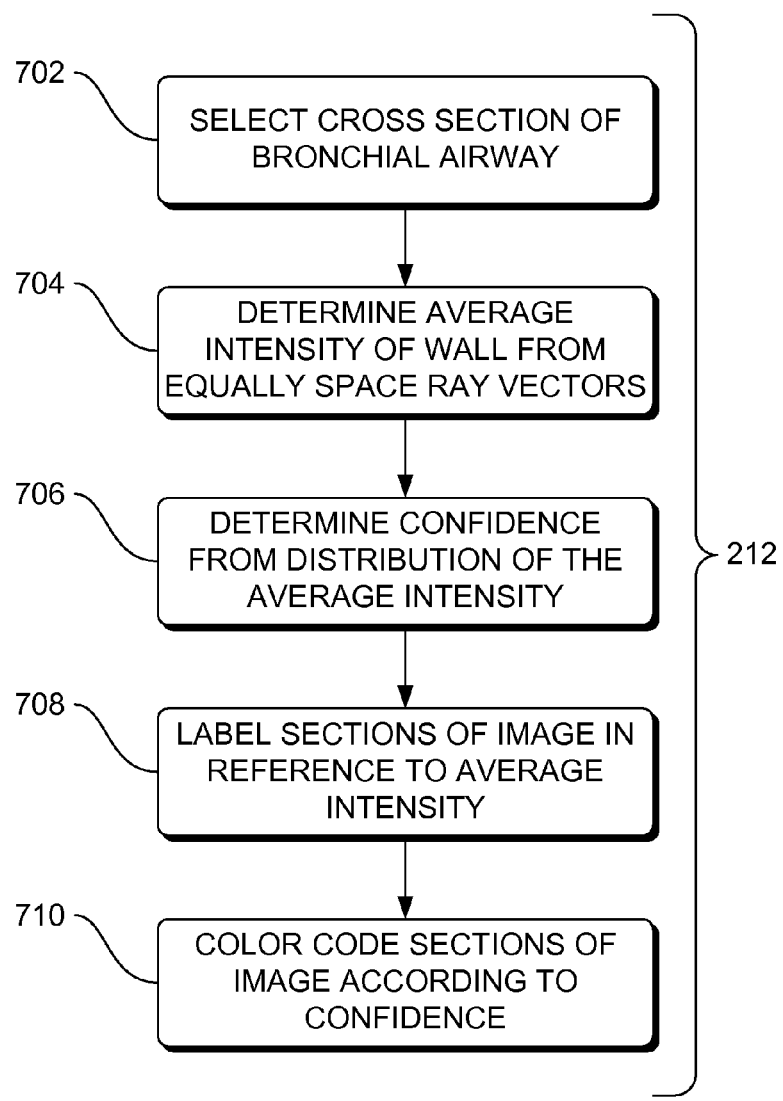
FIG. 7 is a block diagram of a flowchart of a method to color-code confidence in wall contours.

FIG. 7 is a block diagram of a flowchart of a method 700 to color-code confidence in wall contours. Method 700 is one example of color-coding confidence in wall contours at block 212 in FIG. 2.

Some aspects of method 700 include selecting a representation of a cross section of a bronchial airway in an image, at block 702. Some aspects of method 700 include determining average intensity of a wall in the bronchial airway from equally space ray vectors, at block 704.

Some aspects of method 700 include determining a confidence in the measurement of a contour of the wall from a distribution of the average intensity of the ray vectors, at block 706. Some aspects of method 700 include labeling sections of the image in the memory in reference to the average intensity, at block 708.

Some aspects of method 700 include color coding sections of the image in the memory according to the confidence, at block 710.

Figure 8:
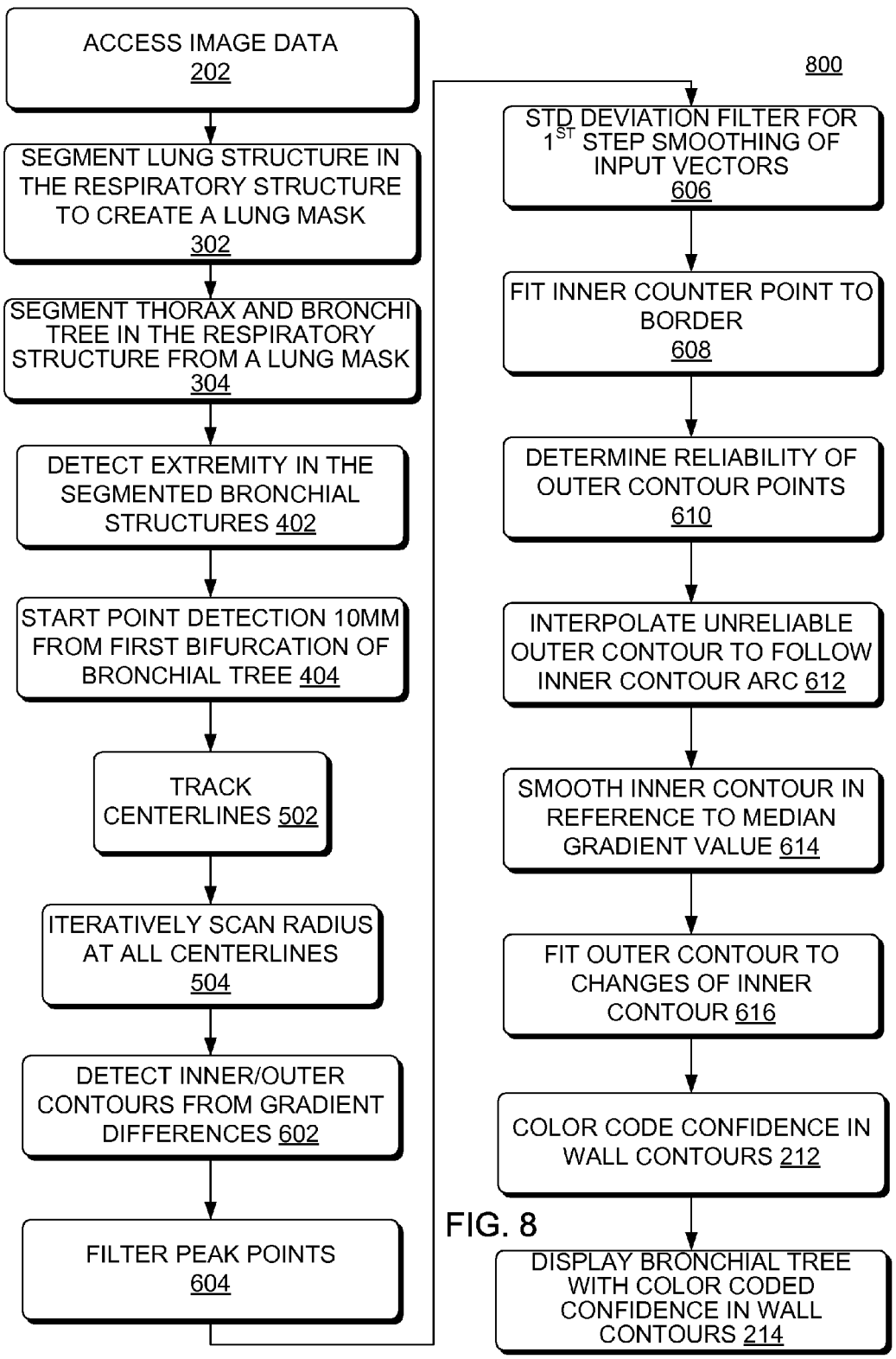
FIG. 8 is a block diagram of a flowchart of a method to image a respiratory structure.

FIG. 8 is a block diagram of a flowchart of a method 800 to image a respiratory structure. Method 800 is an aggregation of the methods in FIGS. 1-6. In method 800, wall thickness for an entire bronchial tree is obtained and color-coded for visualization of segments with a sufficient level of confidence of a reliable measurement. Method 800 determines if wall measurements are corrupted by presence of blood vessels and color codes the extent of the corruption of the measurements for the user.

After loading of the image series of a respiratory system, at block 202, a series of segmentation processes are applied to the image series, at blocks 302 and 304, to obtain the thoracic and bronchial tree, thus creating a lung mask. The lung mask is used to segment the thoracic and the bronchial tree, at block 304. From the segmented thoracic/bronchial tree, a distance map is generated which is used to detect of the extremities of every bronchi, at block 402, and is also used in the detection of a start point (e.g. approximately above with 10 of Carina), at block 404, which eliminates the thorax structure in the image, the thorax having no useful information in a diagnosis of chronic obstructive pulmonary disease.

A centerline is tracked from the start point to all extremity points, at block 502. Subsequent actions include radius scanning in three dimensions at every point of the centerlines, at block 504, and determining a rough approximation of the inner lumen contours and outer wall contours, at block 602. The above processes are applied on a reformat axial view, where the contours of the lumen/wall in most of the cases are distorted, and above all if the interested section is situated on any bronchial branch where the cutting section plan is tilted from the standard axial plan. From the rough contour description, a series of filters is applied to remove all unwanted information and to smooth the rough contours.

A first filter removes peaks introduced by the non-homogenous lumen and tissue area of the airway, and removes the errors introduced by tilting of the plan, at block 604. Another filter is applied to a smoothing algorithm over the distance vectors to reduce differences in one common contour, at block 606. Distance vectors are the list of values, which describe distances from the center point to every contour point. Another filtering fits the inner contour to a real border with tissue where is the level of confidence of contrast is sufficient, at block 608. A section of the outer contour is defined from a dynamic interval adjustment in function of the inner contour diameter, which are reliable as real outer border, or just a border with the vessel lumen, at block 610. Thereafter, small isolated reliable segments are detected and linked. An interpolation is applied to non-reliable sections to follow an arc of the inner contour, in order to prevent large discrepancies in contour arcs, at block 612. To yield better and smoother quality contours, a filter is applied on the inner contour, which smoothes contour points based on the mean Hounsfield Units (HU) value of the contour, and the contour points are adjusted to this mean HU value, at block 614. After the inner contour smoothing, the outer contour is fitted to follow the changes in the non-reliable section, at block 616.

Thereafter, the inner-outer contours are displayed in color-coded cross section view, at block 214. Green colored portions indicate where the level of confidence is enough to say the portion is a well defined border. Yellow colored sections indicate where the level of confidence in the definition of the border is poor.

An example of a computer useful in implementing methods 200-800 is described below with reference to FIG. 12.

Images

FIG. 9 is an illustration 900 of exemplary results of smoothing of inner contours. One example of the smoothing is at block 606 in FIG. 6. Illustration 600 is a cross section image that shows an outer contour 902 and an inner contour 904 of a bronchial airway.

Figure 10:
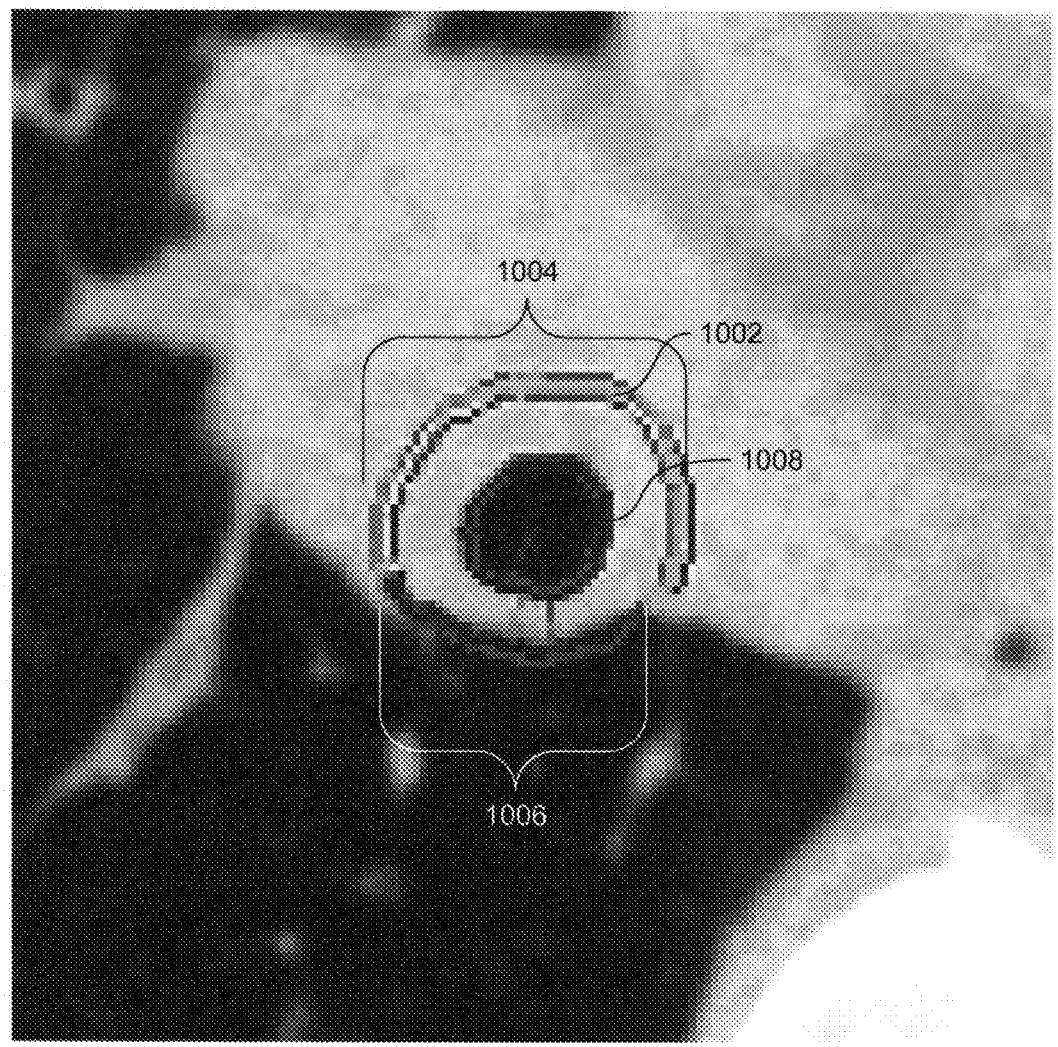
FIG. 10 is an illustration of an image of bronchial airway wall color-coded according to confidence in the measurement of a contour of the wall.

FIG. 10 is an illustration 1000 of an image of bronchial airway wall color-coded according to confidence in the measurement of a contour of the wall. Illustration 1000 shows an outer contour 1002 of a bronchial airway that is a reliable section of the contour 1004 that is color-coded to a yellow color wherein at least 50% but not greater than 90% of the rays are the range of the normal airway Hounsfield Units (HU).

Illustration 1000 image shows the outer contour 1002 of a bronchial airway that is color-coded 1004 to a green color wherein greater than 90% of the rays are in the range of the normal airway HU.

Illustration 1000 also includes a reliable section of an inner contour 1008 of the bronchial contour that is color-coded to a green color wherein greater than 90% of the rays are in the range of the normal airway HU.

The inner contour 1004 or the outer contour 1008 of the bronchial contour is color-coded to a red color wherein less than 50% of the rays are in the range of the normal airway HU. Thus, illustration 1000 shows final color-coding of a detected bronchial airway wall.

Hardware and Operating Environment

Figure 11:
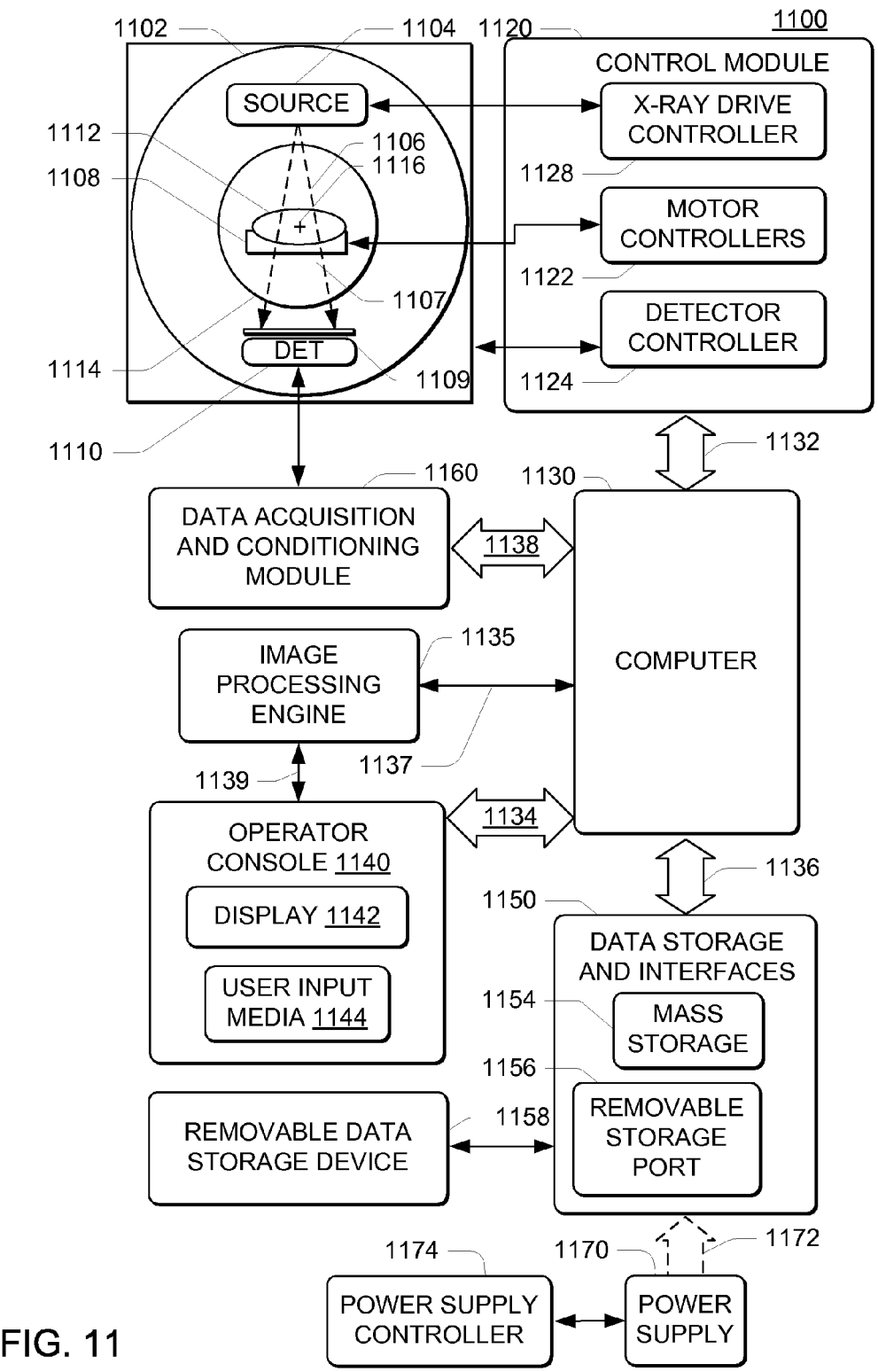
FIG. 11 is a simplified diagram of an overview of a modified system configured to improve X-ray imaging operations.

FIG. 11 is a simplified diagram of an overview of a modified system 1100 configured to improve X-ray imaging operations. The system 1100 optionally includes a gantry 1102 or other support for an illumination source 1104, such as an X-ray illumination source, capable of providing illumination 1106, such as X-rays or other non-destructive internal imaging illumination, and can optionally include a test subject support 1108 that is transmissive with respect to the illumination 1106 and that is positioned above a scintillator 1109 and detector 1110 that is also opposed to the illumination source 1104. Alternatively, a direct conversion detector 1110 can be employed without need for a scintillator.

In one embodiment, components of the system 1100 and a test subject 1112 are maintained in a defined geometric relationship to one another by the gantry 1102. A distance between the illumination source 1104 and the detector 1110 can be varied, depending on the type of examination sought, and the angle of the illumination 1106 respective to the test subject 1112 can be adjusted with respect to the body to be imaged responsive to the nature of imaging desired.

In one embodiment, the test subject support 1108 is configured to support and/or cause controlled motion of the test subject 1112, such as a living human or animal patient, or other test subject 1112 suitable for non-destructive imaging, above the scintillator 1109/detector 1110 so that illumination 1107 is incident thereon after passing through the test subject 1112. In turn, information from the detector array 1110 describes internal aspects of the test subject 1112.

The scintillator 1109 can be a conventional CsI scintillator 1109, optically coupled to an array of photodiodes (not illustrated), such as a two-dimensional array of photodiodes and suitable control transistors formed using semiconductor material such as amorphous silicon, or any other form of detector 1110 suitable for use with the type or types of illumination 1106 being employed, such as X-rays. The detector elements are typically tesselated in a mosaic. The scintillator 1109 converts incident photons comprising electromagnetic radiation, such as X-rays, from high-energy, high-frequency photons 1107, into lower-energy, lower-frequency photons corresponding to spectral sensitivity of the detector elements, in a fashion somewhat analogous to fluorescence, as is commonly known in the context of many visible-light sources in use today. Alternatively, the detector 1110 can be formed as a flat-panel array including amorphous Silicon ($\alpha$-Si) active elements, together with either a scintillator layer 1109, or a direct converter material such as Cadmium Zinc Telluride (CdZnTe), Mercuric Iodide ($HgI_2$), Lead Iodide ($PbI_2$), or amorphous Selenium ($\alpha$-Se).

In some modes of operation, such as CT, the gantry 1102 and test subject support or table 1108 cooperatively engage to move the test subject 1112 longitudinally within an opening 1114, that is, along an axis 1116 extending into and out of the plane of FIG. 11. In some modes of operation, the gantry 1102 rotates the X-ray source 1104 and detector 1110 about the axis 1116, while the support 1108 moves longitudinally, to provide a helical series of scans of the test subject 1112, where a pitch of the helices is defined as a ratio of a longitudinal distance traveled by the table 1108 during a complete revolution of the gantry 1102, compared to a length of the detector 1110 along the axis 1116 of linear motion.

The system 1100 also optionally includes a control module or controller 1120. The controller 1120 can include a motor control module 1122 configured to move the test subject support 1108 and thus the test subject 1112 relative to the X-ray source 1104 and/or detector 1110, and can also control motors in the gantry 1102 or to position the X-ray illumination source 1104 relative to the test subject 1112 and/or the detector 1110.

The controller 1120 includes a detector controller 1124 configured to control elements within the detector 1110 and to facilitate data transfer therefrom. The controller 1120 also includes a drive parameter controller 1128 configured to control electrical drive parameters delivered to the X-ray source 1104. One or more computers 1130 provide connections to the controller 1120 via a bus 1132 configured for receiving data descriptive of operating conditions and configurations and for supplying appropriate control signals. Buses 1134, 1137 and 1139 act to transfer data and control signals, for example with respect to a module 1135, configured as an image processing engine, via interconnections such as 1137, 1139 that are configured for exchange of signals and data to and/or from the computer 1130 as well as other elements of the system 1100 and/or external computation or communications resources (not illustrated in FIG. 11).

The system 1100 also includes a bus 1136, a bus 1138 and an operator console 1140. The operator console 1140 is coupled to the system 1100 through the bus 1134. The operator console 1140 includes one or more displays 1142 and a user input interface 1144. The user input interface 1144 can include a touchscreen, keyboard, a mouse or other tactile input device, capability for voice commands and/or other input devices. The one or more displays 1142 provide video, symbolic and/or audio information relative to operation of system 1100, user-selectable options and images descriptive of the test subject 1112, and can display a graphical user interface for facilitating user selection among various modes of operation and other system settings.

The image processing engine 1135 facilitates automation of accurate measurement and assessment. The image processing engine 1135 is capable of forming multiple, coordinated images for display, for example via the monitor 1142, to provide the types of depictions described below. The image processing engine 1135 can comprise a separate and distinct module, which can include application-specific integrated circuitry, or can comprise one or more processors coupled with suitable computer-readable program modules, or can comprise a portion of the computer 1130 or other computation device.

The system 1100 also includes memory devices 1150, coupled via the bus 1136 to the computer 1130 through suitable interfaces. Datasets representing three-dimensional data and image or two-dimensional data typically conform to the digital imaging and communications in medicine (DICOM) standard, which is widely adopted for handling, storing, printing, and transmitting information in medical imaging. The DICOM standard includes a file format definition and a network communications protocol. The communication protocol is an application protocol that uses TCP/IP to communicate between systems. DICOM files can be stored in memory devices 1150 and retrieved therefrom, and can be exchanged between two entities that are capable of receiving image and patient data in DICOM format.

The memory devices 1150 include mass data storage capabilities 1154 and one or more removable data storage device ports 1156. The one or more removable data storage device ports 1156 are adapted to detachably couple to portable data memories 1158, which can include optical, magnetic and/or semiconductor memories and can have read and/or write capabilities, and which can be volatile or non-volatile devices or can include a combination of the preceding capabilities.

The system 1100 further includes a data acquisition and conditioning module 1160 that has data inputs coupled to the detector 1110 and that is coupled by the bus 1138 to the one or more computers 1130. The data acquisition and conditioning module 1160 includes analog to digital conversion circuitry for capturing analog data from the detector 1110 and then converting those data from the detector 1110 into digital form, to be supplied to the one or more computers 1130 for ultimate display via at least one of the displays 1142 and for potential storage in the mass storage device 1154 and/or data exchange with remote facilities (not shown in FIG. 11). The acquired image data can be conditioned in either the data acquisition and conditioning module 1160 or the one or more computers 1130 or both.

The system 1100 also includes a power supply 1170, coupled via interconnections represented as a power supply bus 1172, shown in dashed outline, to other system elements, and a power supply controller 1174. In some embodiments, the system 1100 is configured to be a mobile system equipped with a portable power supply 1170, such as a battery. In other words, the system 1100 can comprise a wheeled unit and can be electromotively powered in self-contained fashion, lending physical agility to the ensemble of attributes offered by the system 1100.

Volumetric data collected via exposure of the test subject 1112 to suitable illumination 1106 can be processed via many different types of tools, each intended to enhance some portion of information content described by the data. One result can be inconsistency between analytical results from different types of signal processing tools, or between measurement results corresponding to different measurement times and/or measurement phases.

Figure 12:
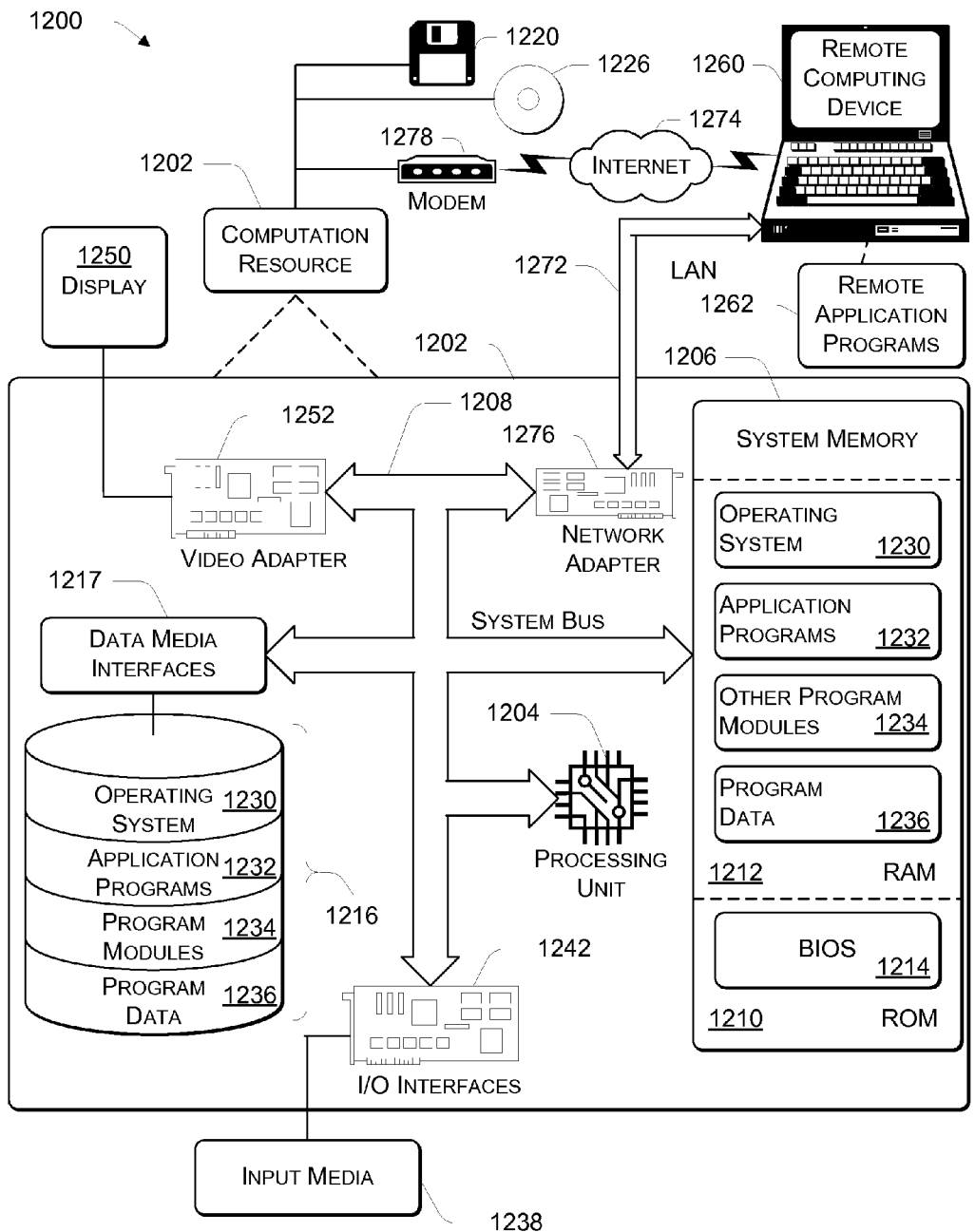
FIG. 12 illustrates an example of a general computer environment useful in the context of the environment of FIG. 11.

FIG. 12 illustrates an example of a general computer environment 1200 useful in the context of the environment of FIG. 11, in accordance with an embodiment of the disclosed subject matter. The general computer environment 1200 includes a computation resource 1202 capable of implementing the processes described herein. It will be appreciated that other devices can alternatively used that include more components, or fewer components, than those illustrated in FIG. 12.

The illustrated operating environment 1200 is only one example of a suitable operating environment, and the example described with reference to FIG. 12 is not intended to suggest any limitation as to the scope of use or functionality of the embodiments of this disclosure. Other well-known computing systems, environments, and/or configurations can be suitable for implementation and/or application of the subject matter disclosed herein.

The computation resource 1202 includes one or more processors or processing units 1204, a system memory 1206, and a bus 1208 that couples various system components including the system memory 1206 to processor(s) 1204 and other elements in the environment 1200. The bus 1208 represents one or more of any of several types of bus structures, including a memory bus or memory controller, a peripheral bus, an accelerated graphics port and a processor or local bus using any of a variety of bus architectures, and can be compatible with SCSI (small computer system interconnect), or other conventional bus architectures and protocols.

The system memory 1206 includes nonvolatile read-only memory (ROM) 1210 and random access memory (RAM) 1212, which can or can not include volatile memory elements. A basic input/output system (BIOS) 1214, containing the elementary routines that help to transfer information between elements within computation resource 1202 and with external items, typically invoked into operating memory during start-up, is stored in ROM 1210.

The computation resource 1202 further can include a non-volatile read/write memory 1216, represented in FIG. 12 as a hard disk drive, coupled to bus 1208 via a data media interface 1217 (e.g., a SCSI, ATA, or other type of interface); a magnetic disk drive (not shown) for reading from, and/or writing to, a removable magnetic disk 1220 and an optical disk drive (not shown) for reading from, and/or writing to, a removable optical disk 1226 such as a CD, DVD, or other optical media.

The non-volatile read/write memory 1216 and associated computer-readable media provide nonvolatile storage of computer-readable instructions, data structures, program modules and other data for the computation resource 1202. Although the exemplary environment 1200 is described herein as employing a non-volatile read/write memory 1216, a removable magnetic disk 1220 and a removable optical disk 1226, it will be appreciated by those skilled in the art that other types of computer-readable media which can store data that is accessible by a computer, such as magnetic cassettes, FLASH memory cards, random access memories (RAMs), read only memories (ROM), and the like, can also be used in the exemplary operating environment.

A number of program modules can be stored via the non-volatile read/write memory 1216, magnetic disk 1220, optical disk 1226, ROM 1210, or RAM 1212, including an operating system 1230, one or more application programs 1232, other program modules 1234 and program data 1236. Examples of computer operating systems conventionally employed for some types of three-dimensional and/or two-dimensional medical image data include the NUCLEUS® operating system, the LINUX® operating system, and others, for example, providing capability for supporting application programs 1232 using, for example, code modules written in the C++® computer programming language.

A user can enter commands and information into computation resource 1202 through input devices such as input media 1238 (e.g., keyboard/keypad, tactile input or pointing device, mouse, foot-operated switching apparatus, joystick, touchscreen or touchpad, microphone, antenna etc.). Such input devices 1238 are coupled to the processing unit 1204 through a conventional input/output interface 1242 that is, in turn, coupled to the system bus. A monitor 1250 or other type of display device is also coupled to the system bus 1208 via an interface, such as a video adapter 1252.

The computation resource 1202 can include capability for operating in a networked environment (as illustrated in FIG. 11, for example) using logical connections to one or more remote computers, such as a remote computer 1260. The remote computer 1260 can be a personal computer, a server, a router, a network PC, a peer device or other common network node, and typically includes many or all of the elements described above relative to the computation resource 1202. In a networked environment, program modules depicted relative to the computation resource 1202, or portions thereof, can be stored in a remote memory storage device such as can be associated with the remote computer 1260. By way of example, remote application programs 1262 reside on a memory device of the remote computer 1260. The logical connections represented in FIG. 12 can include interface capabilities, e.g., such as interface capabilities 1152 (FIG. 11) a storage area network (SAN, not illustrated in FIG. 12), local area network (LAN) 1272 and/or a wide area network (WAN) 1274, but can also include other networks.

Such networking environments are commonplace in modern computer systems, and in association with intranets and the Internet. In certain embodiments, the computation resource 1202 executes an Internet Web browser program (which can optionally be integrated into the operating system 1230), such as the "Internet Explorer®" Web browser manufactured and distributed by the Microsoft Corporation of Redmond, Wash.

When used in a LAN-coupled environment, the computation resource 1202 communicates with or through the local area network 1272 via a network interface or adapter 1276. When used in a WAN-coupled environment, the computation resource 1202 typically includes interfaces, such as a modem 1278, or other apparatus, for establishing communications with or through the WAN 1274, such as the Internet. The modem 1278, which can be internal or external, is coupled to the system bus 1208 via a serial port interface.

In a networked environment, program modules depicted relative to the computation resource 1202, or portions thereof, can be stored in remote memory apparatus. It will be appreciated that the network connections shown are exemplary and other means of establishing a communications link between various computer systems and elements can be used.

A user of a computer can operate in a networked environment 1100 using logical connections to one or more remote computers, such as a remote computer 1260, which can be a personal computer, a server, a router, a network PC, a peer device or other common network node. Typically, a remote computer 1260 includes many or all of the elements described above relative to the computer 1200 of FIG. 12.

The computation resource 1202 typically includes at least some form of computer-readable media. Computer-readable media can be any available media that can be accessed by the computation resource 1202. By way of example, and not limitation, computer-readable media can comprise computer storage media and communication media.

Computer storage media include volatile and nonvolatile, removable and non-removable media, implemented in any method or technology for storage of information, such as computer-readable instructions, data structures, program modules or other data. The term "computer storage media" includes, but is not limited to, RAM, ROM, EEPROM, FLASH memory or other memory technology, CD, DVD, or other optical storage, magnetic cassettes, magnetic tape, magnetic disk storage or other magnetic storage devices, or any other media which can be used to store computer-intelligible information and which can be accessed by the computation resource 1202.

Communication media typically embodies computer-readable instructions, data structures, program modules or other data, represented via, and determinable from, a modulated data signal, such as a carrier wave or other transport mechanism, and includes any information delivery media. The term "modulated data signal" means a signal that has one or more of its characteristics set or changed in such a manner as to encode information in the signal in a fashion amenable to computer interpretation.

By way of example, and not limitation, communication media include wired media, such as wired network or direct-wired connections, and wireless media, such as acoustic, RF, infrared and other wireless media. The scope of the term computer-readable media includes combinations of any of the above.

The computer 1202 can function as one or more of the control segments of module 1120 (FIG. 11), the computer 1130, the operator console 1140 and/or the data acquisition and conditioning module 1160, for example, via implementation of the processes 100 and 400 of FIGS. 1 and 4, respectively, as one or more computer program modules.

CONCLUSION

Although specific embodiments have been illustrated and described herein, it will be appreciated by those of ordinary skill in the art that any arrangement which is calculated to achieve the same purpose can be substituted for the specific embodiments shown. This disclosure is intended to cover any adaptations or variations. For example, although described in procedural terms, one of ordinary skill in the art will appreciate that implementations can be made in a procedural design environment or any other design environment that provides the required relationships.

In particular, one of skill in the art will readily appreciate that the names or labels of the processes and apparatus are not intended to limit embodiments. Furthermore, additional processes and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future communication devices, different file systems, and new data types. The terminology used in this disclosure is meant to include all object-oriented, database and communication environments and alternate technologies which provide the same functionality as described herein.

What is claimed is:

1. A method comprising:
   accessing patient image data in a memory;
   identifying segments of a respiratory structure in the image data;
   detecting at least one extremity in the segmented respiratory structure;
   tracking a bronchial tree in the segmented respiratory structure; determining wall contours in the bronchial tree and improve reliability; and
   color-coding confidence in wall contours.

2. The method of claim 1, the method further comprising:
   displaying a visual representation of the bronchial tree with color coded confidence in wall contours of the bronchial tree.

3. The method of claim 1, wherein the accessing further comprises:
   acquiring a computed-tomography image of the patient, yielding the patient image data in the memory.

4. The method of claim 1, wherein identifying segments further comprises:
   segmenting a lung structure in the respiratory structure; and
   segmenting a thorax and bronchi tree in the respiratory structure from the segmented lung structure.

5. The method of claim 1, wherein detecting at least one extremity further comprises:
   detecting extremity in the segmented bronchial structures; and
   starting point detection about 10 mm from a first bifurcation of the bronchial tree.

6. The method of claim 1, wherein tracking a bronchial tree further comprises:
   tracking centerlines in the bronchial tree; and
   scanning iteratively radius at all centerlines.

7. The method of claim 1, wherein the determining wall contours further comprises:
   selecting a cross section of a bronchial airway;
   determining average intensity of a wall in the bronchial airway from equally space ray vectors;
   determining confidence from a distribution of the average intensity;
   labeling sections of the image in the memory in reference to the average intensity; and
   color coding sections of the image in the memory according to the confidence.

8. A non-transitory computer readable medium having executable instructions to image a respiratory structure, the executable instructions capable of directing a processor to perform:
   selecting a cross section of a representation of a bronchial airway in an image in a memory;
   determining average intensity of a wall in the bronchial airway from equally space ray vectors;
   determining a confidence in the measurement of a contour of the wall from a distribution of the average intensity of the ray vectors;
   labeling sections of the image in the memory in reference to the average intensity; and
   color coding sections of the image in the memory according to the confidence.

9. The non-transitory computer readable medium of claim 8, wherein the executable instructions further comprise:
   displaying a visual representation of the bronchial tree with the color coded confidence in wall contours of the bronchial tree.

10. The non-transitory computer readable medium of claim 8, wherein the executable instructions further comprise:
    accessing patient image data in the memory;
    identifying segments of a respiratory structure in the image data; detecting at least one extremity in the segmented respiratory structures; tracking a bronchial tree, having the bronchial airway, in the segmented respiratory structures; and determining wall contours in the bronchial tree and improve reliability of the wall contours.

11. The non-transitory computer readable medium of claim 8, wherein the executable instructions capable of color coding further comprise executable instructions capable of directing the processor to perform:

labeling a ray with an indication of an airway if the average wall intensity along a ray is in a range of a normal airway Hounsfield Units;

labeling a ray with an indication of a vessel if the average wall intensity along a ray is in a range of a blood vessel Hounsfield Units; and labeling a ray with an indication of a mixed area if the average wall intensity along a ray is in between the range of a blood vessel Hounsfield Units and the range of normal airway Hounsfield Units.

12. The non-transitory computer readable medium of claim 11, wherein the executable instructions capable of color coding further comprise executable instructions capable of directing the processor to perform:

color coding with a green color if greater than 90% in the range of the normal airway Hounsfield Units;

color coding with a red color if less than 50% in the range of the normal airway Hounsfield Units; and color coding with a yellow if at least 50% in the range of the normal airway Hounsfield Units and if not greater than 90% in the range of the normal airway Hounsfield Units.

13. A system comprising:

a processor;

a storage device coupled to the processor including a plurality of computed-tomography images; and software apparatus operative on the processor comprising:

an intensity analyzer operable to receive a representation of a segmented organ in the computed-tomography images and operable to receive a plurality of equally-spaced ray vectors, and to determine average voxel intensity of contours of cross sections from the representation of the segmented organ and from the equally-spaced ray vectors; and a cross section confidence analyzer operable to determine a measure of confidence of contours from the average voxel intensity of contours of the cross sections.

14. The system of claim 13, wherein the cross section confidence analyzer further comprises software apparatus operative on the processor to:

label a ray with an indication of an airway if the average wall intensity along a ray is in a range of a normal airway Hounsfield Units;

label a ray with an indication of a vessel if the average wall intensity along a ray is in a range of a blood vessel Hounsfield Units; and label a ray with an indication of a mixed area if the average wall intensity along a ray is in between the range of a blood vessel Hounsfield Units and the range of normal airway Hounsfield Units.

15. The system of claim 14, wherein the cross section confidence analyzer further comprises software apparatus operative on the processor to:

color code with a green color if greater than 90% in the range of the normal airway Hounsfield Units;

color code with a red color if less than 50% in the range of the normal airway Hounsfield Units; and color code with a yellow if at least 50% in the range of the normal airway Hounsfield Units and if not greater than 90% in the range of the normal airway Hounsfield Units.

16. The system of claim 13, wherein the organ is an upper respiratory tree and the software apparatus is further operative on the processor to:

display a visual representation of a bronchial tree in the upper respiratory tree with color coded confidence in wall contours of the bronchial tree.

17. The system of claim 13, wherein the organ is an upper respiratory tree and the software apparatus is further operative on the processor to:

identify segments of the respiratory structure in image data;

detect at least one extremity in the segmented respiratory structure;

track a bronchial tree in the segmented respiratory structure; and determine wall contours in the bronchial tree and improve reliability.

18. The system of claim 17, wherein the organ is an upper respiratory tree and the software apparatus to identify segments is further operative on the processor to:

segment a lung structure in the respiratory structure; and segment a thorax and bronchi tree in the respiratory structure from the segmented lung structure.

19. The system of claim 17, wherein the organ is an upper respiratory tree and the software apparatus to detect at least one extremity is further operative on the processor to:

detect extremity in the segmented bronchial structures; and start point detection about 10 mm from a first bifurcation of the bronchial tree.

20. The system of claim 17, wherein the software apparatus to track a bronchial tree is further operative on the processor to:

track centerlines; and scan iteratively radius at all centerlines.

* * * * *